United States Patent Office 2,856,246
Patented Oct. 14, 1958

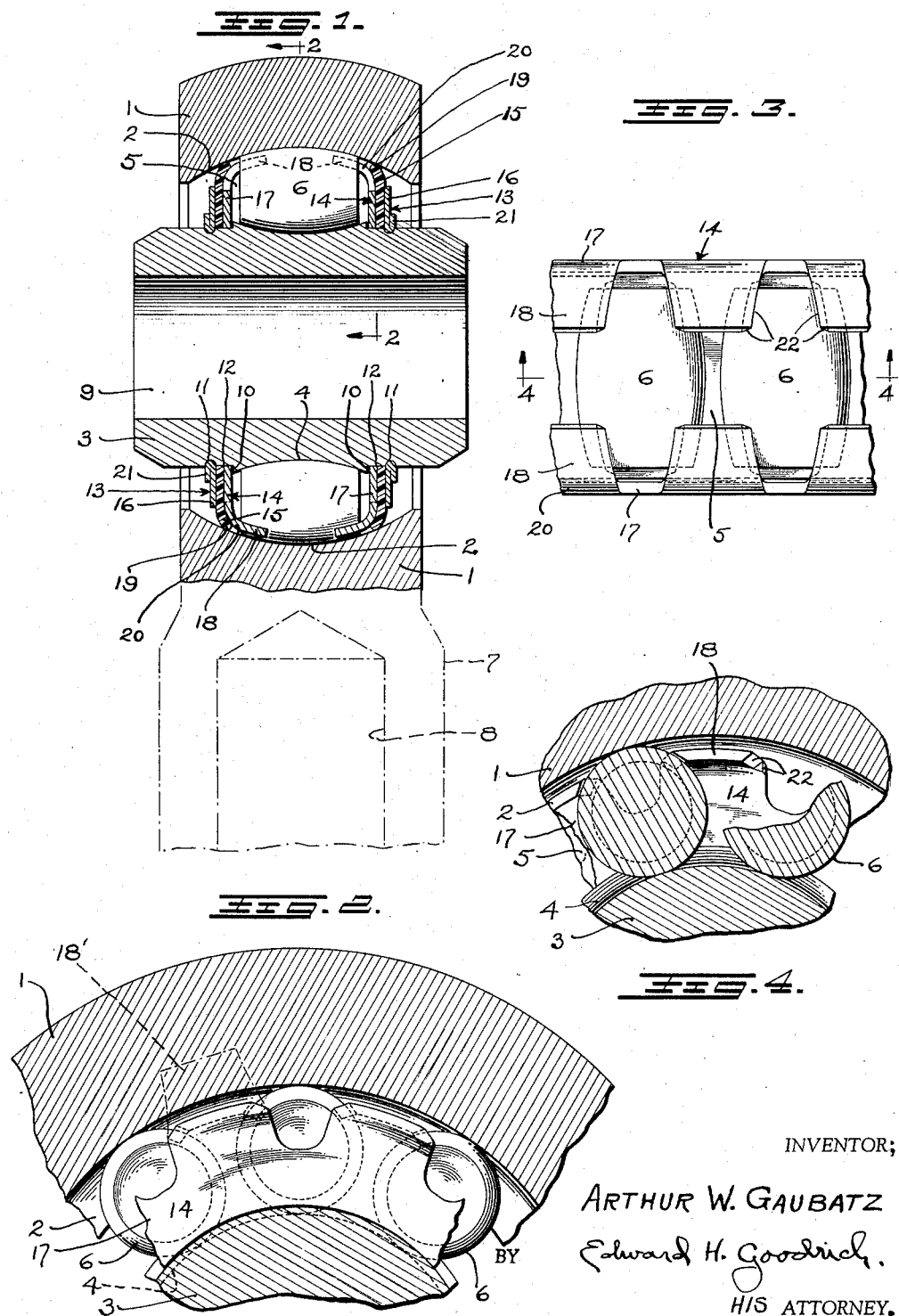

2,856,246

ANTIFRICTION BEARING

Arthur W. Gaubatz, Indianapolis, Ind., assignor to General Motors Corporation, Detroit, Mich., a corporation of Delaware Application February 28, 1956, Serial No. 568,247

8 Claims. (Cl. 308—187.2)

The present invention relates to a novel mounting unit for anti-friction bearing assemblies. Such an assembly may comprise inner and outer race rings having opposed raceways defining therebetween an annular chamber which receives a plurality of circumferentially spaced roller bearing elements. The mounting unit may comprise a spacer member to maintain the spacing of the bearing elements, a sealing washer closing the annular bearing-filled chamber against egress of lubricating fluid and entry of foreign matter, and a retaining ring which is seated on the inner race ring. The retaining ring is associated with the spacer member and sealing washer to axially locate them in their respective operating relationships with the bearing assembly irrespective of relative misalignment occurring between the inner and outer race rings during operation.

In the operation of antifriction bearing assemblies of the type described, it is not uncommon for the inner and outer race rings between which are positioned the load bearing elements to become misaligned due to vibrations, shocks, or other action induced by the environment in which the assembly is employed. In some situations, the effect of these vibrations or shocks may be to jar the sealing element out of the bearing assembly. Under these circumstances, it is imperative to provide means for positively maintaining the position of the bearing elements within the assembly while effectively sealing the bearings, notwithstanding the extreme degree of misalignment to which the race rings may be subjected. Furthermore, because such bearing assemblies are large production items, it is desirable to provide a structure, to accomplish the aforementioned results, which is inexpensive, easily handled and provides ready assembling, inspection and replacement advantages while being sufficiently durable to withstand the deleterious effects of long operation.

It is, therefore, an object of this invention to provide a novel mounting unit for an antifriction bearing assembly which comprises various elements to respectively space and maintain the bearing elements within the raceways, seal the assembly from foreign matter and prevent loss of lubricating fluid and to axially locate and retain the unit and bearing elements in proper operating relationship with the bearing assembly race rings and raceways during sustained periods of extreme operational conditions.

It is another object of this invention to provide a novel mounting unit adapted to be mounted entirely on the exterior surface of an inner race ring and which maintains the desired operating relationship of the inner and outer race rings and raceways and the bearing elements positioned therebetween even during periods of ring misalignment, and permits ready inspection of the interior of the bearing and replacement of lubricant.

More specifically, it is an object of this invention to provide a novel mounting unit for a plurality of anti-friction roller bearing elements circumferentially spaced between opposed raceways of inner and outer race rings of a bearing assembly which unit is compact, and easily and positively mounted on and demounted from the exterior surface of the inner race ring to one side of the annular bearing-filled chamber formed between the opposed raceways of the inner and outer race rings.

It is particularly contemplated to provide a mounting unit for bearing elements used in conjunction with a rod-end antifriction bearing assembly which may be employed in control linkages for various purposes such as for controlling power plants and steering mechanisms in which the bearing assembly is subjected to sporadic or sustained periods of misalignment due to shocks, vibrations and similar effects, and in which the unit effectively maintains the spacing of adjacent bearing elements, seals the bearing assembly and seats the entire unit on the inner race ring to preclude axial shifting movement of the unit out of the assembly during operation. As the mounting unit is positioned on the inner race ring, the outer race ring may be displaced with respect to the remainder of the bearing assembly to replenish lubricating fluid or permit inspection of the assembly without disturbing the mounting of the bearing elements.

These and other objects of the invention will appear more fully hereinafter as the description of the novel mounting unit proceeds.

In the drawings:

Fig. 1 is a cross-sectional elevation illustrating a bearing assembly employing a preferred form of the novel mounting unit.

Fig. 2 is a fragmentary section on line 2—2 of Fig. 1 to show in more detail the configuration of the spacer ring of the mounting unit in operating relationship with the bearing elements of the assembly.

Fig. 3 is a partial plan view of the spacer ring in operating relationship with the bearing elements.

Fig. 4 is a section on line 4—4 of Fig. 3 further showing the configuration of the mounting unit spacer ring and spaced tangs integral therewith.

Referring to Fig. 1, there may be seen a bearing assembly which includes an outer race ring 1 having a transversely arcuate outer raceway 2 and an inner race ring 3 having a concave inner raceway 4 formed intermediate its axial width and opposed to the outer raceway thereby defining an annular chamber 5 which receives a plurality of circumferentially spaced generally barrel-shaped rollers 6 having a transversely arcuate external configuration cooperating with that of the inner and outer raceways. If desired, the outer raceway 2 may be parti-spherical so that the inner race ring 3 may accommodate itself to a required angular position.

Such an assembly is capable of many uses well known in the art. A particular use contemplated by this invention is one in which the outer race ring is employed as a rod-end in a linkage for controlling power plants, steering mechanisms and the like. When the assembly is employed in such a linkage, the rod 7 may be bored at 8 and the inner race ring bored at 9 to receive other parts of the linkage.

The raceway 4 terminates at each end in an annular shoulder 10 on the inner race ring 3. Axially spaced from each of these shoulders and remote from the raceway 4 there is formed in the exterior cylindrical surface of the inner race ring an annular groove 11. The annular surfaces on the inner race ring between each shoulder 10 and groove 11 form cylindrical lands 12 which receive the novel mounting unit as will appear more fully hereinafter.

Separate and similar mounting units 13 are preferably employed at each side of the annular chamber 5 defined by the opposed raceways.

Each mounting unit 13 includes a spacer member 14, a flexible resilient sealing washer 15 and a retaining ring 16. The spacer member 14 has an annular ring portion 17 mounted on the inner race ring land 12, preferably in sliding, abutting engagement with the shoulder 10 and land 12, and further includes a plurality of circumferentially spaced integral tangs 18 which are bent over axially with respect to the bearing axis to project into the annular chamber 5 between adjacent pairs of barrel rollers 6. Prior to bending, the tangs extend generally radially from the spacer member 14 as indicated at 18′ in Fig. 2. The degree of bending of the tangs with respect to the spacer ring 14 is dictated by the radial spacing employed between the opposed inner and outer rings to either side of the annular chamber so that the tangs are radially spaced from the surface of the outer raceway 2 but in close proximity thereto to cooperate with the laterally bent over peripheral edge 19 of the sealing washer for maintaining an effective seal which retains lubricant in chamber 5 and excludes dirt therefrom. The tangs 18 are circumferentially spaced with respect to each other so that the rolling elements 6 are free to rotate therebetween when there is relative race ring rotation.

The annular flexible sealing washer 15 which is held between the spacer member 14 and the retaining ring 16, is of sufficient radial width to extend between the land 12 of the inner ring 3 and the outer raceway 2. With this arrangement, the sealing washer 15 will sealingly engage the land 12 and sealingly engage the ring portion 17 as well as the outer race ring surface 2, and the tangs 18 will urge the peripheral lip 19 of the seal against the outer raceway as shown in Figure 1.

The retaining ring 16 is return-bent along its inner periphery at 21, this return-bend being seated within the annular groove 11 in the inner race ring while the remainder of the ring preferably laterally supports a portion of the sealing washer 15. The periphery of the ring 16 lies in spaced relation to the outer race ring 1 and preferably adjacent the bent-over sealing lip 19.

The integral spacer member 14 is preferably made of suitable metal with the tangs tapered from their roots to their tips to generally conform to the spherical curvature of the bearing surfaces of the barrel rollers, and are bevelled on their edges 22 to generally conform without binding engagement to the circumferential curvatures of the rollers in any plane of contact normal to the longitudinal axis of the rollers (Figs. 2–4). Further, it will be noted from Figs. 3 and 4 that the distance between opposite edges 22 of adjacent tangs is smaller than the diameter of the roller used to properly space and retain the rollers while in operation.

The resilient sealing washer 15 may be composed of flexible sheet material such as synthetic rubber, synthetic polymeric amide, commonly known as nylon, tetrafluorethylene, known in the trade as "Teflon" or other suitable materials.

In operation, it may be seen that the mounting unit 13 is axially located on the inner race ring 3 and carries with it means for maintaining the circumferential spacing of the barrel rollers as well as maintaining the outer periphery of the sealing washer in slidable, sealing contact against the outer raceway 2 irrespective of relative misalignment between the two race rings. Furthermore, this construction permits tiltable movement of the outer race ring with respect to the inner race ring to expose the rollers for inspection and lubrication. The seal, seal retainer, and spacer prevent the assembly from falling apart when the outer race is moved to uncover the rollers.

I claim:

1. In a bearing assembly comprising inner and outer race rings having opposed raceway portions defining therebetween an annular chamber within which are positioned a plurality of circumferentially spaced antifriction bearing elements, a mounting unit for said bearing elements; said unit comprising means for circumferentially spacing said bearing elements within said chamber, a resiliently flexible sealing washer in relatively rotatable wiping engagement with the outer race ring and forming a closure for an end of said annular chamber, and means laterally engaging the sealing washer and axially locating said mounting unit on said inner race ring.

2. In a bearing assembly comprising inner and outer race rings having opposed raceway portions defining therebetween an annular chamber within which are positioned a plurality of circumferentially spaced antifriction bearing elements, an integrated mounting unit for said bearing elements; said unit comprising means for circumferentially spacing said bearing elements within said chamber, a resiliently flexible sealing washer forming a closure for said annular chamber, said washer having a peripheral lip laterally deformed in resiliently wiping sealing engagement with the raceway portion of the outer race ring, and retaining means seated on said inner race ring against the sealing washer and axially locating said mounting unit.

3. In a bearing assembly comprising inner and outer race rings having opposed raceway portions defining therebetween an annular chamber within which are positioned a plurality of circumferentially spaced antifriction bearing elements, said inner ring raceway forming with said inner ring an annular shoulder, said inner race ring having an annular groove axially spaced from said annular chamber to form an annular land therebetween, a mounting unit for said bearing elements positioned on said land; said unit comprising means abutting said shoulder and circumferentially spacing said bearing elements within said chamber, wall means abutting said spacing means and forming a closure for said annular chamber, and retaining means seated in said groove to axially locate said mounting unit.

4. In a bearing assembly comprising inner and outer race rings having opposed raceway portions defining therebetween an annular chamber within which are positioned a plurality of circumferentially spaced antifriction bearing elements, a mounting unit for said bearing elements; said unit comprising spacing means for said bearing elements, wall means forming a closure for said annular chamber, and means axially locating said mounting unit on said inner race ring to one side of said annular chamber, said spacing means including an annular ring having a plurality of circumferentially spaced integral tangs bent over axially and projecting within said chamber between adjacent bearing elements, said tangs being radially spaced from said outer ring and outer raceway, said sealing means including a flexible outer peripheral edge lying against and supported by a portion of said bent over tang in sealing engagement with said outer race ring.

5. In a bearing assembly comprising inner and outer race rings having opposed raceway portions defining therebetween an annular chamber within which are positioned a plurality of circumferentially spaced antifriction bearing elements, an integrated mounting unit for said bearing elements; said unit comprising means for circumferentially spacing said bearing elements within said chamber, wall means forming a closure for said annular chamber, and retaining means seated on said inner race ring and axially locating said mounting unit, said spacing means including an annular ring having a plurality of circumferentially spaced integral tangs bent over axially and projecting within said chamber between adjacent bearing elements, said tangs being radially spaced from said outer ring and outer raceway, said sealing means including a flexible outer peripheral edge lying against and supported by a portion of said tangs in sealing engagement with said outer race ring.

6. In a bearing assembly comprising inner and outer race rings having opposed raceway portions defining therebetween an annular chamber within which are positioned a plurality of circumferentially spaced antifriction bearing elements, said inner race ring having an annular groove axially spaced from said annular chamber to form an annular land therebetween, an integrated mounting unit for said bearing elements positioned on said land; said unit comprising means for circumferentially spacing said bearing elements within said chamber, wall means forming a closure for said annular chamber and retaining means seated in said groove to axially locate said mounting unit, said spacing means including an annular ring having a plurality of circumferentially spaced integral tangs bent over axially and projecting within said chamber between adjacent bearing elements, said tangs being radially spaced from said outer ring and outer raceway, said sealing means including a flexible outer peripheral edge lying against and supported by a portion of said tangs in sealing engagement with said outer race ring.

7. In a bearing assembly comprising inner and outer race rings having opposed raceway portions defining therebetween an annular chamber within which are positioned a plurality of circumferentially spaced antifriction bearing elements, said inner ring raceway forming with said inner ring an annular shoulder, said inner race ring having an annular groove axially spaced from said annular shoulder to form an annular land therebetween, a mounting unit for said bearing elements positioned on said land; said unit comprising a spacer member having an annular ring portion abutting said shoulder and a plurality of circumferentially spaced tangs bent over axially from said ring and projecting within said chamber between adjacent bearing elements, said tangs being radially spaced from said outer ring and outer raceway, wall means abutting said spacer member and forming a closure for said annular chamber, said wall means including a flexible outer peripheral edge lying against and supported by said tangs in sealing engagement with said outer race ring, and retaining means seated in said groove and abutting said wall to axially locate said mounting unit.

8. A mounting unit for a series of bearing elements positioned between first and second bearing members, a shoulder on said first bearing member adjacent said series of bearing elements, a groove on said first bearing member spaced from said shoulder remote from said series of bearing elements, said unit being axially located on said first bearing member between said shoulder and groove and comprising a spacer member abutting said shoulder and spaced from said second bearing member and engaging said bearing elements to maintain the relative spacing therebetween, sealing means abutting said spacer member and extending between said first and second bearing members and a retaining ring abutting said sealing member and seated in said groove and spaced from said second bearing member.

References Cited in the file of this patent

UNITED STATES PATENTS 2,622,934   Phelps _____ Dec. 23, 1952

FOREIGN PATENTS 386,157   France _____ June 5, 1908
407,450   Great Britain _____ Mar. 22, 1934